United States Patent
Chise

(10) Patent No.: US 11,708,781 B1
(45) Date of Patent: Jul. 25, 2023

(54) PORTABLE DEVICE FOR CONTROLLING SUBSYSTEMS INCLUDING EXHAUST SUBSYSTEMS OF VEHICLES

(71) Applicant: OTR Performance, Inc., Macomb, MI (US)

(72) Inventor: Jason Chise, Macomb, MI (US)

(73) Assignee: OTR Performance, Inc., Macomb, MI (US)

( * ) Notice: Subject to any disclaimer, the term of this patent is extended or adjusted under 35 U.S.C. 154(b) by 960 days.

(21) Appl. No.: 16/278,228

(22) Filed: Feb. 18, 2019

(51) Int. Cl.
| | | |
|---|---|---|
| *F01N 9/00* | (2006.01) | |
| *B60R 16/023* | (2006.01) | |
| *F01N 11/00* | (2006.01) | |
| *G01M 15/10* | (2006.01) | |
| *G07C 5/02* | (2006.01) | |
| *B60R 16/033* | (2006.01) | |

(52) U.S. Cl.
CPC .............. *F01N 9/002* (2013.01); *B60R 16/033* (2013.01); *B60R 16/0231* (2013.01); *F01N 9/007* (2013.01); *F01N 11/00* (2013.01); *G01M 15/104* (2013.01); *G07C 5/02* (2013.01)

(58) Field of Classification Search
CPC .... B60R 16/0231; B60R 16/033; F01N 9/002; F01N 9/007; F01N 11/00; G01M 15/104; G07C 5/02
USPC .......................................................... 701/36
See application file for complete search history.

(56) References Cited

U.S. PATENT DOCUMENTS

| | | | | |
|---|---|---|---|---|
| 2010/0313629 A1* | 12/2010 | Singh | .................... | F01N 3/023 73/23.31 |
| 2011/0116950 A1* | 5/2011 | Niwa et al. | ............ | H02K 11/33 417/410.1 |
| 2013/0226394 A1* | 8/2013 | Amirpour et al. | .... | G01M 17/06 701/31.4 |
| 2016/0049018 A1* | 2/2016 | Groß et al. | .............. | G07C 5/02 701/99 |
| 2016/0171791 A1* | 6/2016 | Cervantes et al. | ... | G07C 5/0808 701/31.5 |
| 2018/0223755 A1* | 8/2018 | Shock et al. | ........... | F01N 11/00 |
| 2019/0012854 A1* | 1/2019 | Noonan et al. | ......... | H04W 4/40 |
| 2020/0184745 A1* | 6/2020 | Merg et al. | ............ | G07C 5/008 |

OTHER PUBLICATIONS

VERDICT UserManual AU, https://www.snapontools.com.au/_data/assets/pdf_file/0019/19243/Verdict_User_Manual_AU.pdf (Year: 2015).*
YouTube, uploaded by Exeter Motor Works, "Diesel Particulate filter forced regeneration DPF Regen using snapon verdict", Apr. 14, 2013, https://www.youtube.com/watch?v=Dg7kFnNwNCk (Year: 2013).*

* cited by examiner

*Primary Examiner* — Thomas E Worden
*Assistant Examiner* — Sean Patrick Reidy
(74) *Attorney, Agent, or Firm* — Harness, Dickey & Pierce, P.L.C.; Stephen T. Olson

(57) ABSTRACT

A portable device receives power from a battery of a vehicle when connected to the vehicle via a connector in the vehicle. The portable device determines whether an engine of the vehicle is running and a speed of the vehicle if the engine is running. The portable device clears fault codes of ECUs if the engine is not running. The portable device resets parameters of an ECU controlling an exhaust system of the vehicle to default values if the portable device remains connected to the vehicle for a predetermined time period after sending clearing the fault codes. If the engine is running and that the speed of the vehicle is zero, the portable device initiates a forced regeneration of a diesel particulate filter of the exhaust system.

19 Claims, 7 Drawing Sheets

PORTABLE DEVICE FOR CONTROLLING SUBSYSTEMS INCLUDING EXHAUST SUBSYSTEMS OF VEHICLES

FIELD

The present disclosure relates to a portable device for controlling subsystems including exhaust subsystems of vehicles.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A vehicle typically includes an electronic control system to control various subsystems of the vehicle. For example, the electronic control system includes control modules, generally called electronic control units (ECUs), that control various aspect of subsystems such as an engine, a transmission, an exhaust subsystem, a braking subsystem, and so on of the vehicle. Some of the subsystems include various sensors that sense various parameters and conditions of the subsystems and provide the sensed data to the respective control modules. Some of the subsystems also include various actuators that perform operations based on data received from the respective control modules.

Many of the control modules include onboard diagnostic (OBD) programs that can diagnose some of the problems associated with the respective subsystems based on data sensed by the sensors in the subsystems. Further, some of the diagnostic programs can send commands to the subsystems to perform diagnostic tests on some of the components of the subsystems to identify problems with the subsystems and to verify whether the components and the subsystems operate properly. The diagnostic programs can generate fault codes that can be displayed on a display (e.g., on a dashboard) of the vehicle to indicate the problems and statuses of the subsystems.

While some of the problems can be identified using the onboard diagnostic programs, some other problems cannot be identified using the onboard diagnostic programs and require special diagnostic equipment (e.g., a special computer with advanced diagnostic programs) typically available at a service station (e.g., a dealership). Further, some of the problems identified using the onboard diagnostic programs cannot be solved using the onboard diagnostic programs and require the special diagnostic equipment.

SUMMARY

A portable device for controlling a plurality of subsystems of a vehicle is connected to the vehicle via a connector in the vehicle and receives power from a battery of the vehicle via the connector. The portable device comprises a control circuit to communicate via the connector with a plurality of Electronic Control Units (ECUs) of the vehicle respectively controlling the plurality of subsystems of the vehicle via a Controller Area Network (CAN) bus of the vehicle. The portable device comprises a processor to communicate with the control circuit. The portable device comprises a memory to store instructions which when executed by the processor configure the control circuit to determine whether an engine of the vehicle is running and a speed of the vehicle if the engine is running. The instructions which when executed by the processor configure the control circuit to send data on the CAN bus to clear one or more fault codes associated with one or more of the plurality of ECUs in response to determining that the engine of the vehicle is not running. The instructions which when executed by the processor configure the control circuit to send data on the CAN bus to reset parameters of one of the plurality of ECUs controlling an exhaust system of the vehicle to default values in response to the portable device remaining connected to the vehicle for a predetermined time period after sending the data to clear the one or more fault codes. The instructions which when executed by the processor configure the control circuit to send, in response to determining that the engine is running and that the speed of the vehicle is zero, data on the CAN bus to the one of the plurality of ECUs controlling the exhaust system to initiate a forced regeneration of a diesel particulate filter of the exhaust system of the vehicle.

In other features, the instructions when executed by the processor configure the control circuit to sense a speed of the CAN bus of the vehicle, select a first circuit of the control circuit to communicate with the CAN bus in response to the speed of the CAN bus being a first speed, and select a second circuit of the control circuit to communicate with the CAN bus in response to the speed of the CAN bus being a second speed.

In another feature, the instructions when executed by the processor configure the control circuit to perform an authentication procedure with the plurality of ECUs and secure read/write access to the plurality of ECUs.

In another feature, the instructions when executed by the processor configure the control circuit to initiate the forced regeneration when a parked regeneration of the diesel particulate filter is disabled.

In another feature, the data to clear the one or more fault codes includes commands that are executed by the one or more of the plurality of ECUs to clear the one or more fault codes associated with the one or more of the plurality of ECUs.

In another feature, the data to clear the one or more fault codes further includes commands that are executed by the one or more of the plurality of ECUs to reset data learned by the one or more of the plurality of ECUs.

In another feature, the data to reset the parameters includes commands that are executed by the one of the plurality of ECUs controlling the exhaust system of the vehicle to reset the parameters to the default values.

In another feature, the data to reset the parameters further includes commands that are executed by the one of the plurality of ECUs to reset data learned by the one or more of the plurality of ECUs.

In another feature, the parameters include one or more of a soot level of the diesel particulate filter, an ash level of the diesel particulate filter, a zone level of the diesel particulate filter, regeneration timers of the diesel particulate filter, data learned after a prior regeneration of the diesel particulate filter, NOx sensor data, an efficiency of a selective catalytic reduction component of the exhaust system.

In still other features, a method for controlling a plurality of subsystems of a vehicle using a portable device comprises receiving power at the portable device from a battery of the vehicle in response to the portable device being connected to the vehicle via a connector in the vehicle. The method further comprises communicating, using the portable device, with a plurality of Electronic Control Units (ECUs) of the vehicle respectively controlling the plurality of subsystems of the vehicle via a Controller Area Network (CAN) bus of the vehicle. The method further comprises determining, using the portable device, whether an engine of the vehicle is running and a speed of the vehicle if the engine is running. The method further comprises sending, using the portable device, data on the CAN bus to clear one or more fault codes associated with one or more of the plurality of ECUs in response to determining that the engine of the vehicle is not running. The method further comprises sending, using the portable device, data on the CAN bus to reset parameters of one of the plurality of ECUs controlling an exhaust system of the vehicle to default values in response to the portable device remaining connected to the vehicle for a predetermined time period after sending the data to clear the one or more fault codes. The method further comprises sending, using the portable device, in response to determining that the engine is running and that the speed of the vehicle is zero, data on the CAN bus to the one of the plurality of ECUs controlling the exhaust system to initiate a forced regeneration of a diesel particulate filter of the exhaust system of the vehicle.

In other features, the method further comprises sensing, using the portable device, a speed of the CAN bus of the vehicle; and selecting, based on the speed, a circuit in the portable device to communicate with the CAN bus.

In another feature, the method further comprises performing, using the using the portable device, an authentication procedure with the plurality of ECUs and secure read/write access to the plurality of ECUs.

In another feature, the method further comprises initiating, using the using the portable device, the forced regeneration when a parked regeneration of the diesel particulate filter is disabled.

In another feature, sending the data to clear the one or more fault codes includes sending commands that are executed by the one or more of the plurality of ECUs to clear the one or more fault codes associated with the one or more of the plurality of ECUs.

In another feature, sending the data to clear the one or more fault codes further includes sending commands that are executed by the one or more of the plurality of ECUs to reset data learned by the one or more of the plurality of ECUs.

In another feature, sending the data to reset the parameters includes sending commands that are executed by the one of the plurality of ECUs controlling the exhaust system of the vehicle to reset the parameters to the default values.

In another feature, sending the data to reset the parameters further includes sending commands that are executed by the one of the plurality of ECUs to reset data learned by the one or more of the plurality of ECUs.

In another feature, the parameters include one or more of a soot level of the diesel particulate filter, an ash level of the diesel particulate filter, a zone level of the diesel particulate filter, regeneration timers of the diesel particulate filter, data learned after a prior regeneration of the diesel particulate filter, NOx sensor data, an efficiency of a selective catalytic reduction component of the exhaust system.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
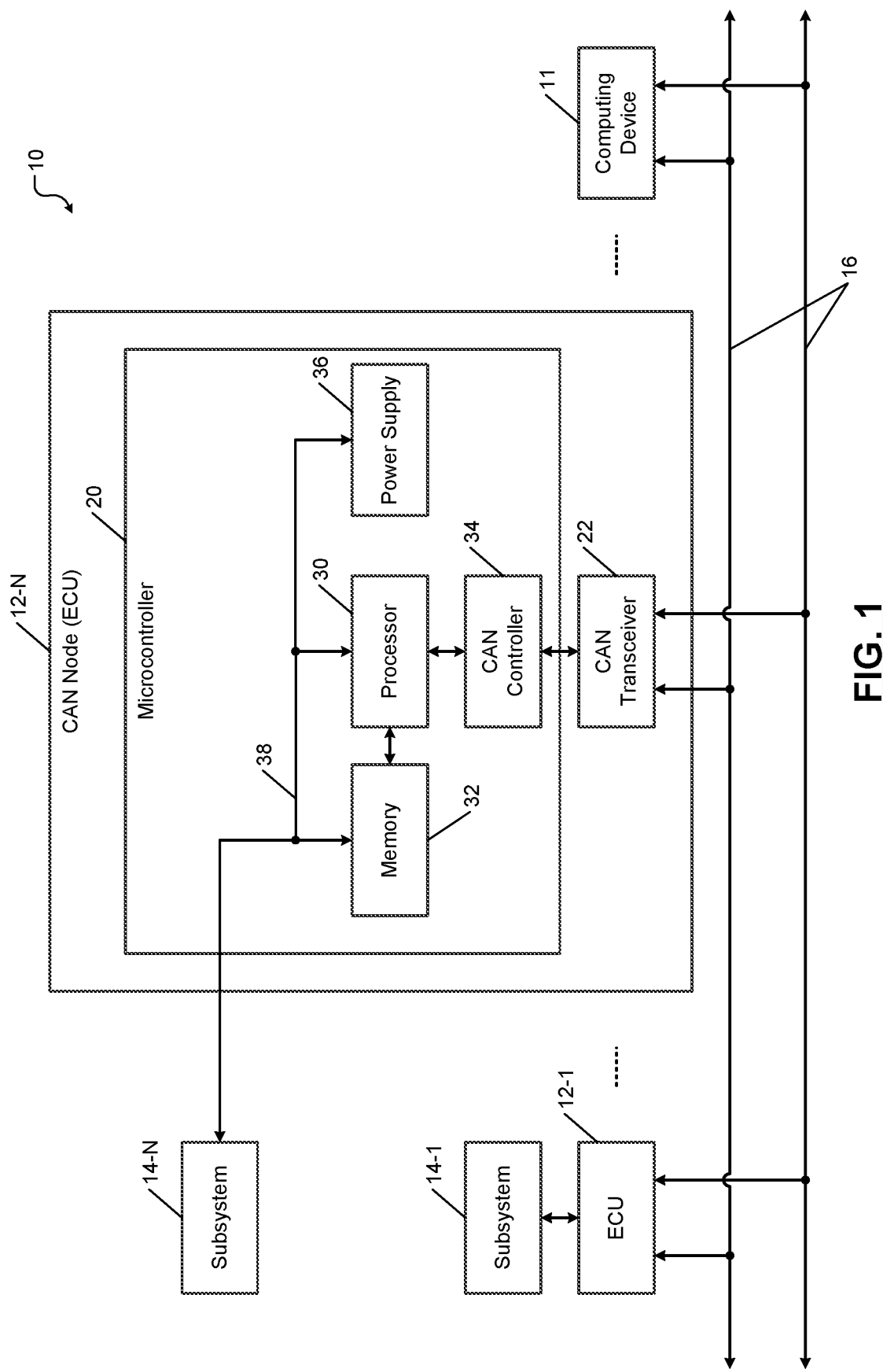
FIG. 1 shows a plurality of subsystems of a vehicle connected to each other using a Controlled Area Network (CAN) bus in the vehicle.

In the drawings, reference numbers may be reused to identify similar and/or identical elements.

A driver of a vehicle can be stranded on a roadway if a fault condition detected by an onboard diagnostic program of a subsystem of the vehicle prevents the vehicle from being driven and requires the vehicle to be towed to a service station for servicing the subsystem. Sometimes, the special diagnostic equipment at the service station may discover that the fault code was merely a stray or ghost fault code and was not an actual problem with the subsystem. In such a situation, the service station uses the special diagnostic equipment to simply reset or clear the fault code, and the driver can drive the vehicle. This is a significant inconvenience to the driver.

Some subsystems of the vehicle may provide warnings that alert the drivers to schedule service for the subsystems but allow the vehicle to be driven for a grace period. If the subsystem is not serviced during the grace period, a fault code or indication may be displayed, and the vehicle cannot be driven until service is performed.

For example, diesel vehicles use a diesel particulate filter (DPF) in exhaust subsystems (also called after-treatment (AFT) systems). The DPF can periodically get clogged due to soot buildup and may require cleaning and/or regeneration. Until the soot level is less than a predetermined amount, a control module controlling the AFT system performs limited regeneration operations while the vehicle is being driven. However, after the soot level exceeds the predetermined amount, the vehicle cannot be driven and must be taken to a service station for performing repair or replacement of the DPF. The service station uses a special diagnostic equipment that verifies various parameters of the after-treatment system and other control systems of the vehicle and performs a special procedure called a forced regeneration of the DPF. Alternatively, the DPF is thoroughly cleaned, or replaced. These options can prevent the vehicle from being used for a day or more and can be costly.

The present disclosure provides a portable device (e.g., a tool) that drivers or operators of vehicles can carry in the vehicle. The portable device allows the drives to clear fault codes, reset the AFT system, and, if necessary, perform a forced regeneration of the DPF anywhere without requiring any special diagnostic equipment, without visiting a service center, and without connecting to any remote device via a network. When the onboard diagnostics indicates a fault code or condition, whether the fault code allows the vehicle to be driven or not, the driver can plug the portable device into a port in the vehicle, and the portable device can clear the fault code, reset the AFT system, and, if necessary, perform a forced regeneration without any input from or interaction with the driver.

Indeed, the portable device does not include any display to show any output to the driver or any keypad to allow any input from the driver to perform these functions, which typically can be performed only by a trained technician by interactively using specialized equipment at a service center. Nor does the portable device require a connection to a remote computing device via a network such as a cellular network or the Internet to perform these functions.

Depending on the fault code, after clearing the fault code using the portable device, the vehicle can be driven for a while, and the driver is not stranded on the road. Depending on the fault code, or if the fault code reappears while the vehicle is being driven after clearing the fault code, the vehicle can be driven to a service station. Further, if the fault code indicates that the DPF must be serviced or replaced, the portable device automatically performs a forced regeneration without requiring any special diagnostic equipment and without visiting a service center. These and other aspects of the present disclosure are explained below in detail.

The present disclosure is organized as follows. Initially, a plurality of subsystems of a vehicle interconnected using a Controlled Area Network (CAN) bus in the vehicle is shown and described with reference to FIG. 1. A diesel exhaust system is shown and described with reference to FIG. 2. A functional block diagram of the portable device of the present disclosure is shown and described with reference to FIG. 3. Flowcharts of various procedures performed by the portable device are shown and described with reference to FIGS. 4–5C.

Automotive electronic control systems are typically implemented as Electronic Control Units (ECUs) that are connected to each other by a Controller Area Network (CAN) bus. Each ECU controls a specific subsystem (e.g., engine, transmission, exhaust, braking, heating and cooling, infotainment, navigation, and so on) of the vehicle. Each ECU includes a microcontroller, a CAN controller, and a transceiver. In each ECU, the microcontroller includes a processor, memory, and other circuits to control the specific subsystem. Each ECU can communicate with other ECUs via the CAN bus through the CAN controller and the transceiver.

FIG. 1 shows an example of a vehicle 10 comprising a plurality of ECUs connected to each other by a CAN bus. A computing device 11 such as the portable device (tool) of the present disclosure can be connected to the vehicle 10 via a port available on the driver side (e.g., under the steering wheel) of the vehicle 10. For example, the port may include a diagnostic port with a connector. For example only, the connector may include a J1939 plug or an OBD2 connector. The computing device 11 receives power from a battery of the vehicle 10 via the port, connects to the CAN bus via the port, communicates with the plurality of ECUs via the CAN bus, and performs operations including clearing fault codes, resetting operating parameters and learned data, performing forced regenerations, and so on.

The portable device of the present disclosure is shown and described below in detail with reference to FIG. 3 and is therefore not described here in further detail. In addition to including the components of the portable device shown in FIG. 3, the computing device 11 includes one or more components of an ECU 12 described below. Accordingly, the computing device 11 can communicate with the CAN bus and can interface (i.e., exchange data) with the ECUs 12 via the CAN bus.

The plurality of ECUs includes ECU-1 12-1, ECU-2 12-2, ..., and ECU-N 12-N (collectively, ECUs 12), where N is an integer greater than one. Hereinafter, ECU 12 refers to any of the plurality of ECUs 12. While FIG. 1 shows a detailed functional block diagram of only the ECU-N 12-N, it will be understood that other ECUs 12 can have structure similar to the ECU-N 12-N. Each ECU 12 or any portion thereof may be implemented as one or more modules.

Each ECU 12 controls a respective subsystem of the vehicle 10. For example, the ECU-1 12-1 controls a subsystem 14-1, the ECU-2 12-2 controls a subsystem 14-2, ..., and the ECU-N 12-N controls a subsystem 14-N. Collectively the subsystems 14-1, 14-2, ..., and 14-N are referred to as subsystems 14. Non-limiting examples of the subsystems 14 include an engine subsystem, a transmission subsystem, an exhaust subsystem, a brake subsystem, a traction subsystem, a suspension subsystem, a climate subsystem, a safety subsystem, an infotainment subsystem, a navigation subsystem, a physiological data acquisition subsystem, a driving data acquisition subsystem, and so on.

Each subsystem 14 may include one or more sensors to sense data from one or more components of the subsystem 14. For example, the exhaust subsystem may include pressure and temperature sensors and soot level sensors to collect data from the components of the exhaust subsystem of the vehicle 10 (e.g., see an example of the exhaust subsystem shown in FIG. 2). The engine subsystem may include sensors to collect data such as revolutions per minute (RPM), temperature, fuel efficiency, various fluid levels, and other data associated with the engine subsystem of the vehicle 10; and so on. Some of the subsystems 14 may include one or more actuators to actuate one or more components of the respective subsystems 14.

An ECU 12 may receive data from one or more sensors of a corresponding subsystem 14. Depending on the type of ECU, the ECU 12 may also receive one or more inputs from an occupant and/or operator of the vehicle 10. The ECU 12 may control one or more actuators of the corresponding subsystem 14 based on the data received from the one or more sensors and/or the one or more inputs.

The ECUs 12 are connected to a CAN bus 16. The ECUs 12 can communicate with each other and with the computing device 11 when connected via the CAN bus 16. The ECUs 12 can communicate with other devices connected to the CAN bus 16 (e.g., a communication gateway, etc.). Each ECU 12 includes a microcontroller 20 and a CAN transceiver 22. The microcontroller 20 communicates with the subsystem 14 controlled by the ECU 12. The CAN transceiver 22 communicates with the CAN bus 16.

The microcontroller 20 includes a processor 30, a memory 32, a CAN controller 34, and a power supply 36. The memory 32 includes volatile memory (RAM) and may additionally include nonvolatile memory (e.g., flash memory) and/or other types of data storage device(s). The processor 30 and the memory 32 communicate with each other via a bus 38. The processor 30 executes code stored in the memory 32 to control the subsystem 14. The power supply 36 supplies power to all of the components of the microcontroller 20 and the ECU 12. The CAN controller 34 communicates with the CAN transceiver 22.

Each ECU 12 can employ security protocols to authenticate access to and communication with the ECU 12 by other ECUs 12, devices, and/or systems external to the vehicle 10. For example, in some vehicles, ECUs that handle communication with devices and/or systems external to the vehicle 10 may employ a higher level of security to prevent hacking. Further, in some vehicles (e.g., autonomous vehicles), the CAN bus may comprise multiple portions, of which some portions may employ a higher level security than the other portions. Some of the ECUs 12 that control some critical operations of the vehicle 10 (e.g., operations to navigate an autonomous vehicle) may be connected to the portion of the CAN bus requiring higher level authentication. Further, some of the ECUs 12 can require other ECUs and external devices (e.g., the computing device 11) to establish a lower level authentication to read data from the ECUs but require a higher level authentication to write data to (e.g., program some aspects of) the EC's 12.

The speed of the CAN bus 16 can also vary in different vehicles. For example, broadly speaking, one version of the CAN bus may be slower (e.g., operate at a relatively lower data rate) while another version of the CAN bus may be faster (e.g., operate at relatively faster data rate). Consequently, the speed at which data can be communicated between the ECUs 12 on the CAN bus 16 and between the computing device 11 and the ECUs 12 via the CAN bus 16 can vary depending on the speed of the CAN bus 16 in a vehicle.

Figure 2:
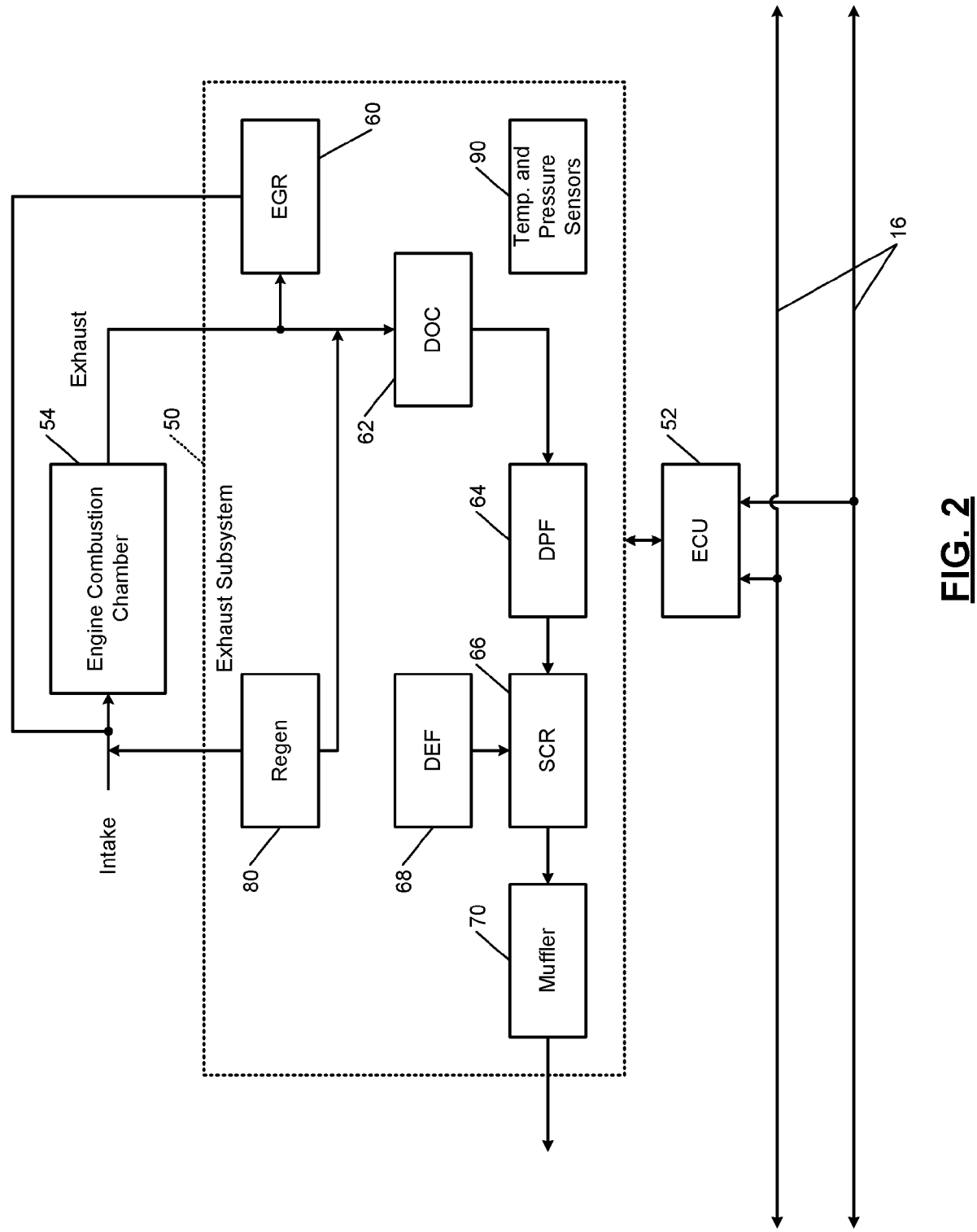
FIG. 2 shows a functional block diagram of an example of an exhaust subsystem of a vehicle equipped with a diesel engine.

FIG. 2 shows a functional block diagram of an example of an exhaust subsystem 50 of a vehicle (e.g., the vehicle 10 shown in FIG. 1) equipped with a diesel engine. The purpose of FIG. 2 is to introduce the elements or components of the exhaust subsystem for a diesel engine that can be controlled using a portion of the computing device 11 as will be described below with reference to FIG. 3. Accordingly, the description of FIG. 2 provides the level of detail that is necessary to understand the operation of the computing device 11 and its interaction with the exhaust subsystem. Further details such as the chemistry and thermodynamics involved in the operation of the various components of the exhaust subsystem are unnecessary to understand the operation of the computing device 11 and are therefore omitted.

The exhaust subsystem 50 is also called an after-treatment (AFT) system and may be referred to as the AFT 50. The AFT 50 processes exhaust materials (e.g., carbon monoxide (CO), NOx, soot, etc.) generated by a diesel combustion engine, of which a combustion chamber is shown at 54 (hereinafter called the engine 54). The AFT 50 communicates with other ECUs of the vehicle (e.g., ECUs 12 of the vehicle 10 shown in FIG. 1) via the CAN bus 16. An ECU 52, which is similar to the ECUs 12 shown in FIG. 1, controls the AFT 50.

While only one ECU 52 is shown, in some applications, more than one ECU may be used to control one or more components of the AFT 50. For example, an ECU 52-1 may control the DPF 64, an ECU 52-2 may control a regeneration component 80, and so on. Accordingly, operations performed on the ECU 52 by the computing device 11 described below with reference to FIG. 3 can be extended to ECU 52-1, ECU 52-2, and so on.

In some implementations, the ECU 52 that controls the AFT 50 may also be an engine ECU. That is, an ECU 12 that controls the engine subsystem 14 may also control the AFT 50. For example, the ECU 12 that controls the engine subsystem 14 may initiate the forced regeneration described below. In other words, the ECU 12 that controls the engine subsystem 14 may also perform one or more functions and operations of the ECU 52.

The AFT 50 comprises an exhaust gas recirculation (EGR) component 60, a diesel oxidation catalyst (DOC) component 62, a diesel particulate filter (DPF) 64, a selective catalytic reduction (SCR) component 66, a diesel exhaust fluid (DEF) component 68, and a muffler 70. In addition, the AFT system 50 comprises a regeneration component 80 that regenerates the DPF 64. Further, the AFT 50 comprises a plurality of temperature and pressure sensors 90 that are located throughout the AFT 50. The sensors 90 provide feedback to one or more components of the AFT 50 as well as to other subsystems of the vehicle via the ECU 52. The sensors 90 are not shown in further detail to simplify the illustration of the components 60-80 of the AFT 50. Further, the AFT 50 also comprises various valves and manifolds, which are also omitted to simplify the illustration of the components 60-80 of the AFT 50.

The EGR 60 helps reduce NOx emissions from the muffler 70. The EGR 60 comprises an EGR valve mounted on an exhaust manifold. The EGR valve regulates the exhaust gas that goes into the engine 54. A portion of the exhaust gas is re-directed and routed into an intake manifold of the engine 54. The intake manifold includes a temperature sensor and a differential pressure sensor (e.g., the sensors 90) to sense the flow of air entering into intake manifold. A turbocharger (not shown) regulates a charge pressure and controls the EGR 60 to create proper turbo drive pressures for the proper amount of EGR flow. While the EGR 60 helps reduce NOx emissions, the EGR 60 causes the engine 54 to create soot due to the mixing of the exhaust gas and fresh air and due to incomplete combustion of fuel. The DPF 64 reduces the soot emissions from the muffler 70 as explained below.

The DOC 62 is located in the exhaust pipe between the EGR 60 and the DPF 64. The DOC 62 uses a series of small passages made of precious metals that route the exhaust gas to come in contact with the precious metals. The DOC 62 reduces unburned hydrocarbons and carbon monoxide (CO) in the exhaust gas by burning (oxidizing) them over a catalyst. This catalyst aids the reaction of the CO and hydrocarbons with remaining oxygen in the exhaust gas. This process can be used to increase the temperature of the exhaust system, which helps in burning the soot as explained below.

The DPF 64 is designed to remove diesel particulate matter called soot from the exhaust gas of the engine 54. When the exhaust gas flows through small passages in the DPF 64 that are made of a ceramic material, the DPF 64 catches the soot exiting the DOC 62. During regeneration, which is explained below in detail, the DPF 64 allows for oxidation of the stored soot when the loading or accumulation level of the soot reaches or exceeds a predetermined level.

The SCR 66 uses a liquid reductant agent (e.g., a urea-based diesel exhaust fluid) that is injected from the DEF 68 into a catalytic converter in the SCR 66 to significantly reduce NOx emissions from the muffler 70.

The DPF 64 requires periodic maintenance to remove soot and ash that builds up in the DPF 64. The soot and ash buildup in the DPF 64 increases the gas pressure upstream from the DPF 64. Warnings are provided to drivers before the restriction of the DPF 64 due to the buildup that can affect the drive-ability of the vehicle, or can damage the engine 54 or the DPF 64. Accordingly, regular maintenance of the DPF 64 is necessary.

DPF's undergo a regeneration process that removes the soot and lowers the upstream pressure on the engine. Depending on the soot level in the DPF 64, passive, active, parked, or forced regeneration process is performed on the DPF 64 by the AFT 50. For example, the regeneration component 80 of the AFT system 50 monitors the soot level of the DPF 64 and performs the appropriate regeneration procedure on the DPF 64 under the control of the ECM 52 as follows.

Passive regeneration is automatically performed by the AFT 50 when the soot level in the DPF 64 is relatively low. Passive regeneration occurs normally while driving the vehicle when engine load and vehicle drive-cycle create temperatures that are high enough to burn the soot buildup in the DPF 64. Passive regeneration does not use additional fuel and does not affect vehicle performance. The vehicle can be driven at regular speeds at rated fuel efficiency when the soot level is relatively low.

Active regeneration is also automatically performed by the AFT 50 when the soot level in the DPF 64 is relatively low. Active regeneration occurs while the vehicle is driven when low engine load and lower exhaust gas temperatures inhibit the naturally occurring passive regeneration. Sensors upstream and downstream of the DPF 64 (or a differential pressure sensor) provide data that initiates a metered addition of fuel into the exhaust stream. The fuel can be injected directly into the exhaust stream, downstream from the turbocharger, or into the engine cylinders on an exhaust stroke. The fuel and exhaust gas mixture passes through the DOC 62. A catalytic reaction between the fuel and the precious metals in the DOC 62 creates heat, which raises the temperature in the DOC 62 and the DPF 64, creating temperatures high enough to burn the accumulated soot in the DPF 64.

After the pressure drop across the DPF 64 decreases to a predetermined value, indicating that the soot level in the DPF 64 is very low, the regeneration process ends. The regeneration process is repeated when the soot accumulation rebuilds in the DPF 64. Active regeneration works well for vehicles that are driven over longer distances with fewer stops compared to the vehicles that operate on short trips with many starts and stops.

If the soot building up in the DPF 64 is relatively high but less than a predetermined threshold, the engine 54 may moderately de-rate or lose power. In such a situation, the driver can initiate a parked regeneration via a dashboard mounted switch. Various interlocks and prerequisite conditions must be met for this process to initiate. Examples of the interlocks include whether parking brake is applied, whether the transmission is in neutral, whether the engine coolant temperature is within acceptable range, and whether any engine related fault codes have occurred. If any of the conditions are not satisfied, the parked regeneration cannot be performed. The parked regeneration injects extra fuel and raises the engine RPM to increase exhaust temperatures for the regeneration to occur.

When the soot accumulation in the DPF 64 exceeds the predetermined threshold level that can be potentially damaging to the engine or the exhaust system, the parked regeneration is disabled (i.e., cannot be performed). The engine usually shuts down, and the vehicle cannot be driven. In such a situation, the only option is to move (mostly tow) the vehicle to a service station, where a specialized diagnostic equipment is used by a trained technician to thoroughly test the exhaust system and to perform a forced regeneration. In some cases, the DPF 64 may have to be thoroughly cleaned at the service station before performing a forced regeneration. In the worst case, the DPF 64 may have to be replaced.

The portable device 11 of the present disclosure allows drives to perform forced regeneration anywhere. The vehicle does not need to be taken to a service station to perform the forced regeneration. The portable device 11 can be used to perform the forced regeneration at any time. Notably, the portable device 11 can perform the forced regeneration without viewing any data related to the AFT 50 or any other subsystem of the vehicle and without requiring any input from the driver. Additionally, the portable device 11 can reset any fault codes before performing the forced regeneration and can erase any learned data of any of the ECUs 12 (including the ECU 52) before and after performing the forced regeneration. Further, after resetting any of the fault codes, the portable device 11 can reset any operating parameters of the AFT 50. These and other features of the portable device 11 are explained in detail below.

Figure 3:
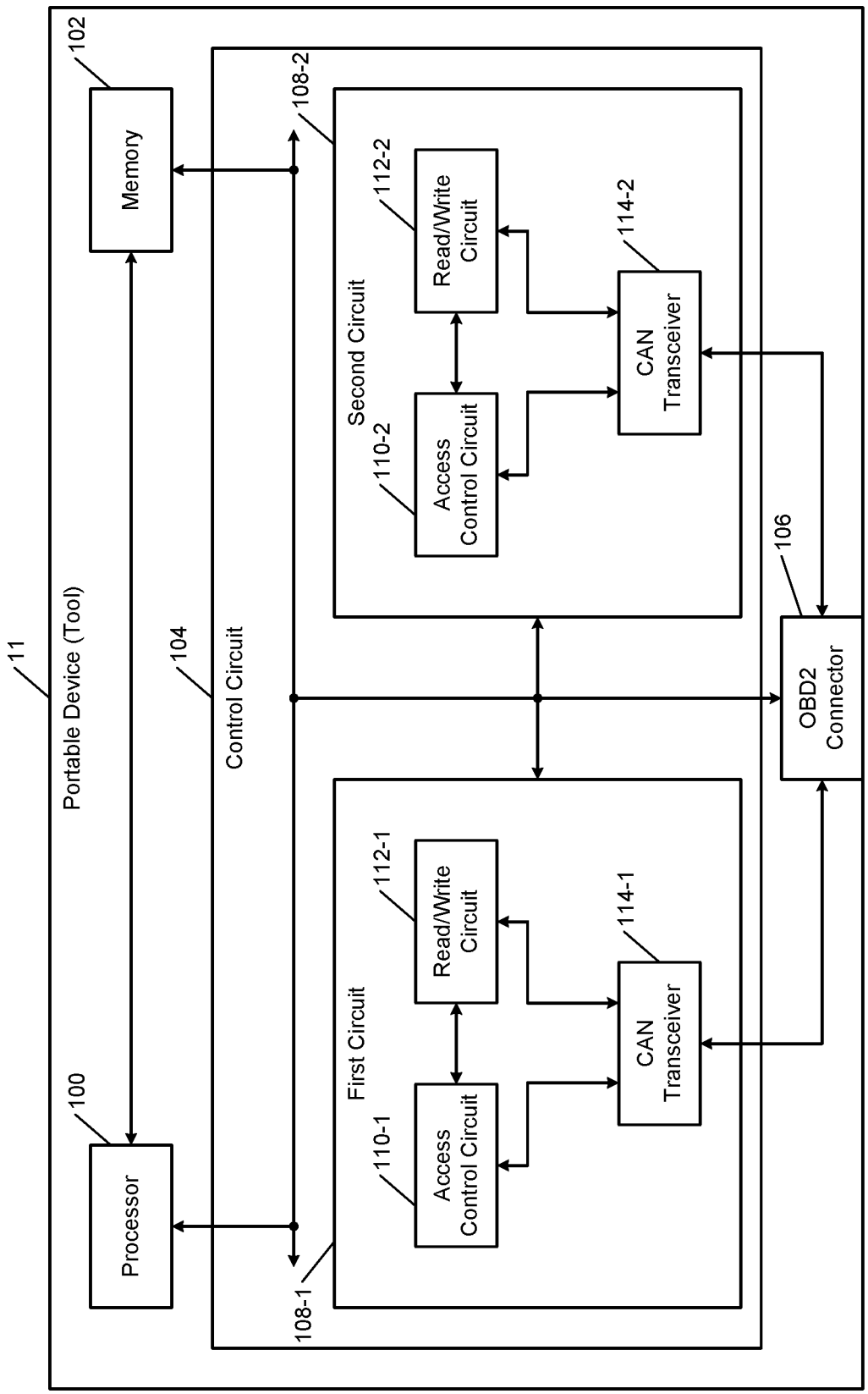
FIG. 3 shows a functional block diagram of a portable device (tool) according to the present disclosure.

FIG. 3 shows the portable device 11 (i.e., the tool) in detail. The portable device 11 comprises a processor 100, memory 102, a control circuit 104, and a connector 106. The connector 106 can connect to a port in the vehicle 10. While only one connector is shown, the portable device 11 may include more than one connector so that the portable device 11 can be connected using different connectors to ports having different types of connectors in different vehicles. The connector 106, when connected to the port in the vehicle 10, connects the portable device 11 to the CAN bus 16 and to a battery of the vehicle 10. Thus, the portable device 11 receives power from the battery of the vehicle 10 via the connector 106.

The control circuit 104 comprises a first circuit 108-1 and a second circuit 108-2. The first circuit 108-1 comprises an access control circuit 110-1, a read write circuit 112-1, and a CAN transceiver 114-1. The second circuit 108-2 comprises an access control circuit 110-2, a read write circuit 112-2, and a CAN transceiver 114-2. The first circuit 108-1 and the second circuit 108-2 may perform functions of the CAN controller 34 described above with reference to FIG. 1. The CAN transceivers 114-1 and 114-2 may perform functions of the CAN transceiver 22 described above with reference to FIG. 1.

In some implementations, the first circuit 108-1 and the second circuit 108-2 may not include the CAN transceivers 114-1 and 114-2, respectively. Instead, the control circuit 104 may include a single CAN transceiver such as the CAN transceiver 22 described above with reference to FIG. 1. The single CAN transceiver may be connected to the connector 106, and each of the first circuit 108-1 and the second circuit 108-2 may communicate with the single CAN transceiver.

Figure 4:
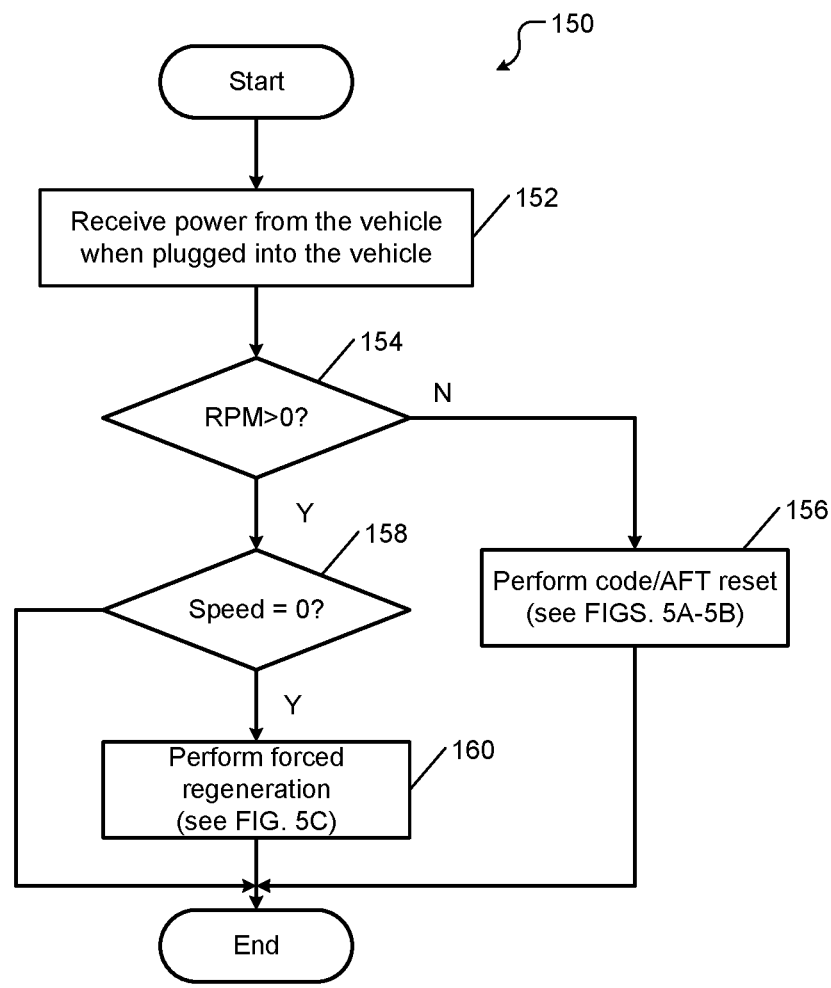
FIG. 4 shows an overview of procedures performed by the portable device according to the present disclosure.
Figure 5A:
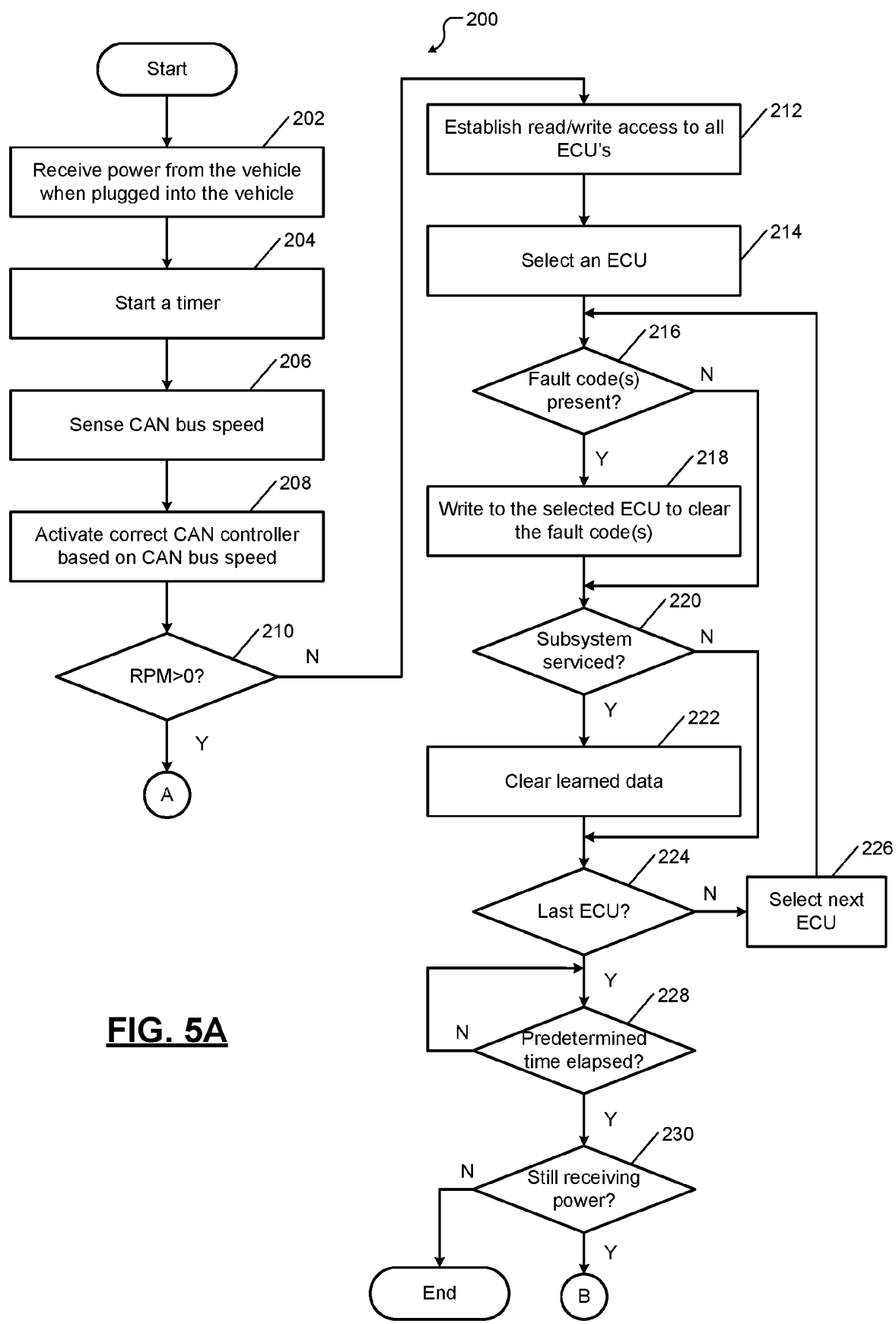
FIGS. 5A-5C show in detail the procedures performed by the portable device in detail according to the present disclosure.
Figure 5B:
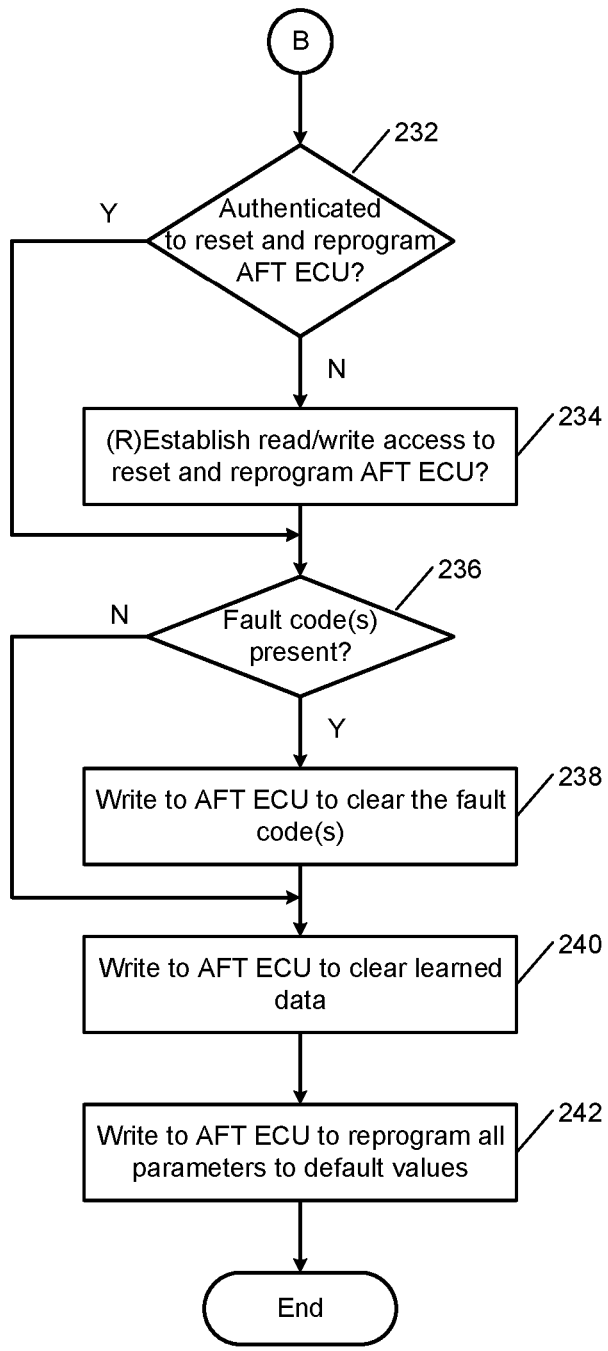
Figure 5C:
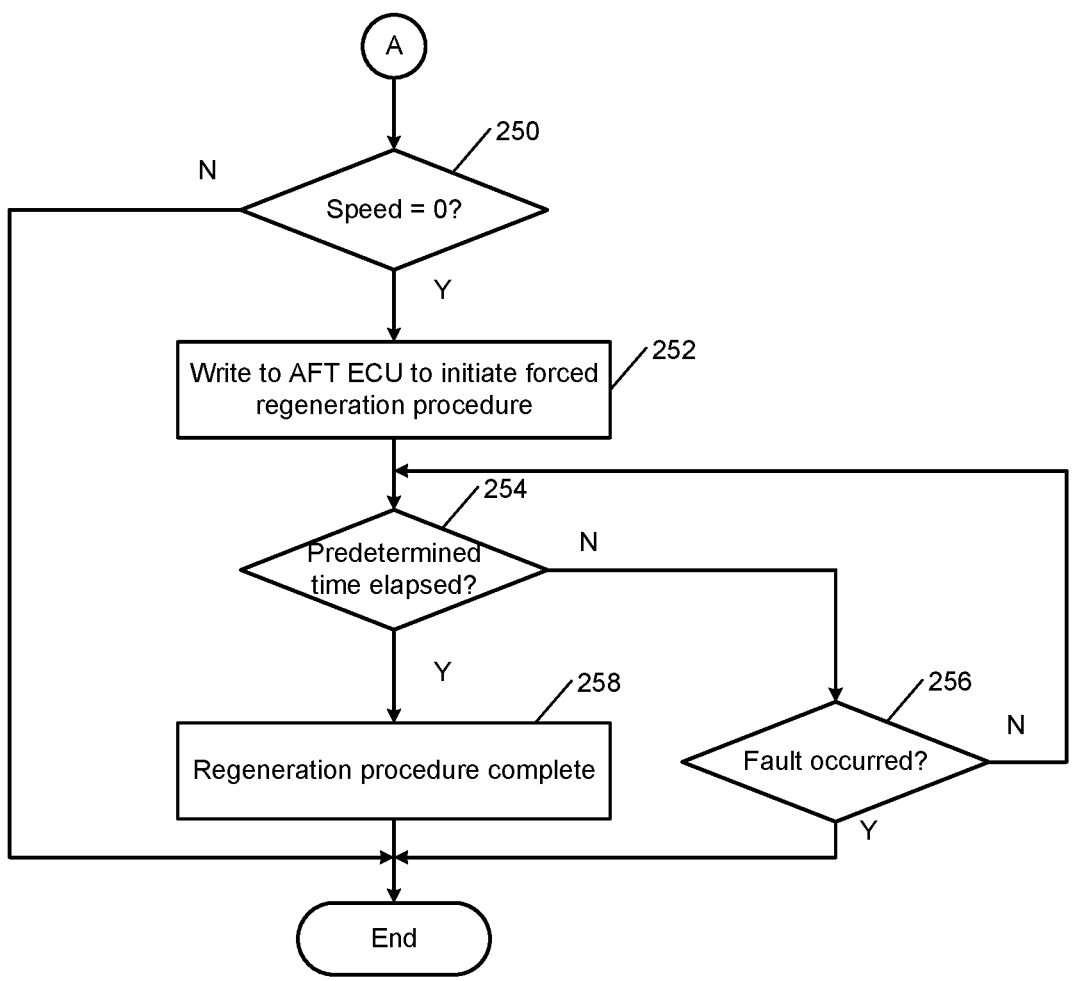

The operations of the portable device 11 are now described in detail with reference to FIGS. 4–5C. FIGS. 4–5C show various procedures or methods performed by the portable device 11. FIG. 4 shows an overview of the procedures. FIGS. 5A-5C show the procedures in detail. These methods include instructions that are stored in the memory 102 of the portable device 11 and that are executed by the processor 100 of the portable device 11. The instructions, when executed by the processor 100, program the control circuit 104 (e.g., program the first circuit 108-1 or the second circuit 108-2) and cause the control circuit 104 (e.g., cause the first circuit 108-1 or the second circuit 108-2) to perform the described functions and operations.

FIG. 4 shows a method 150 performed by the portable device 11. At 152, the portable device 11 receives power from the vehicle 10 when the portable device 11 is connected to a port (e.g., an OBD2 connector) in the vehicle 10 via the connector 106 of the portable device 11. The portable device 11 gets connected to the CAN bus 16 of the vehicle 10 when the portable device 11 is connected to a port (e.g., an OBD2 connector) in the vehicle 10 via the connector 106.

At 154, based on the connection to the CAN bus 16 of the vehicle 10, the processor 100 of the portable device 11 determines whether the engine of the vehicle 10 is running (i.e., if RPM of the engine is greater than zero). At 156, if the processor 100 determines that the engine of the vehicle 10 is not running (i.e., if the RPM is not greater than zero), the processor 100 executes instructions to perform a procedure to reset fault codes as shown in FIG. 5A, or procedure to reset fault codes and reset the AFT 50 as shown in FIGS. 5A and 5B.

At 158, if the processor 100 determines that the engine of the vehicle 10 is running (i.e., if the RPM is greater than zero), the processor 100 further determines, based on the connection to the CAN bus 16 of the vehicle 10, if the vehicle 10 is at rest (i.e., if the speed of the vehicle 10 is zero). The method 150 ends if the vehicle 10 is moving (i.e., if the speed of the vehicle 10 is not zero). At 160, if the vehicle 10 is at rest (i.e., if the speed of the vehicle 10 is zero), the processor 100 executes instructions to perform a forced regeneration of the DPF 64 as shown in FIG. 5C.

In use, when the driver of the vehicle 10 notices any fault code on the dashboard of the vehicle 10, the driver stops the vehicle 10, and turns off the ignition. After waiting for about a minute, the driver turns on the ignition only, and does not start the engine. After waiting for about a minute after turning on the ignition only, the driver connects the portable device 11 to the vehicle 10. The portable device 11 powers up using power from the battery of the vehicle 10. The portable device 11 checks the engine RPM and since the engine RPM is zero, executes the procedure to reset fault codes associated with any of the ECUs 12 of the vehicle.

This procedure (i.e., resetting of the fault codes) takes about one minute to complete. Accordingly, the driver only wants to reset the fault codes, the driver can disconnect the portable device 11 from the vehicle 10 after about one minute. If, however, the driver also wants to reset the AFT 50, the driver does not disconnect the portable device 11 from the vehicle 10 after about one minute. Instead, the driver leaves the portable device 11 connected to the vehicle 10 for an additional two minutes. In the additional two minutes, the portable device 11 resets the AFT 50. After about three minutes total, the driver can disconnect the portable device 11 from the vehicle 10 and begin driving the vehicle 10. If the fault codes recur, the driver can repeat the above process or schedule service. The driver is not stranded on the road and does not have to tow the vehicle 10 to a service center.

In some instances, the driver may want to perform a forced regeneration of the DPF 64. For example, the driver may have replaced a component of the AFT 50, and may want to or need to perform a forced regeneration of the DPF 64. Alternatively, the AFT 50 may be providing a warning or a fault code regarding the soot level of the DPF 64 on the dashboard of the vehicle 10, and/or the engine of the vehicle 10 may be de-rating. If a fault code regarding the soot level of the DPF 64 is being displayed on the dashboard of the vehicle 10, depending on the severity of the soot level indicated by the fault code, before performing the forced regeneration, the driver may perform the fault code reset procedure to see if the fault code disappears. The driver may also perform the AFT reset procedure before performing the forced regeneration. If resetting the fault codes and resetting the AFT 50 does not solve the problem, the driver may also attempt to perform a parked regeneration. If the parked regeneration is disabled (i.e., cannot be initiated) because the soot level in the DPF is extremely high, performing forced regeneration is the only choice left for the driver.

To initiate the forced regeneration procedure, the driver stops the vehicle 10, turns off the ignition, and engages the parking brake. After waiting for about a minute, the driver turns on the ignition, starts the engine, and allows the engine to idle. After waiting for about a minute, the driver connects the portable device 11 to the vehicle 10. The portable device 11 powers up using power from the battery of the vehicle 10. The portable device 11 checks the engine RPM and vehicle speed. Since the engine RPM is not zero and the vehicle speed is zero, the portable device 11 executes the forced regeneration procedure. During the forced regeneration procedure, the engine RPM increase, the temperature of the AFT 50 increases, and the soot in the DPF 64 is burned in about 30-60 minutes. Thereafter, the driver can disconnect the portable device 11 from the vehicle 10, let the engine idle to allow the DPF 64 to cool down, and begin driving the vehicle 10. The driver is not stranded on the road and does not have to tow the vehicle 10 to a service center.

FIGS. 5A-5C show a method 200 performed by the portable device 11. The method 200 shows the method 150 of FIG. 4 in further detail. While not segregated as such, FIGS. 5A-5B show the portions of the method 200 that the portable device 11 performs to clear fault codes of the ECUs 12 and to reset the AFT 50, and FIG. 5C show the portions of the method 200 that the portable device 11 performs to perform a forced regeneration on the DPF 64.

At 202, the portable device 11 receives power from the vehicle 10 when the portable device 11 is connected to a port (e.g., an OBD2 connector) in the vehicle 10 via the connector 106 of the portable device 11. The portable device 11 gets connected to the CAN bus 16 of the vehicle 10 when the portable device 11 is connected to a port (e.g., an OBD2 connector) in the vehicle 10 via the connector 106.

At 204, the processor 100 starts a timer. At 206, the processor 100 senses a speed of the CAN bus 16. For example, the processor 100 can query one of the ECUs 12, receive data regarding the type of the CAN bus 16, and determine or learn the speed of the CAN bus 16 from the received data. Alternatively, the processor 100 can transmit and receive data on the CAN bus 16 via one of the CAN transceivers 114 and determine the speed of the CAN bus 16 based on the transmitted and received data. Other methods of determining the speed of the CAN bus 16 may be used.

At 208, the processor 100 activates the first circuit 108-1 or the second circuit 108-2 depending on the sensed speed of the CAN bus 16. For example, the processor 100 activates the first circuit 108-1 if the speed of the CAN bus 16 is a first speed (e.g., a relatively low speed) or the second circuit 108-

1 if the speed of the CAN bus 16 is a second speed (e.g., a relatively high speed).

At 210, the processor 100 or the selected first or second circuit 108 determines whether the engine of the vehicle 10 is running (i.e., if RPM of the engine is greater than zero). For example, the processor 100 or the selected first or second circuit 108 can transmit a query to an engine ECU 12 and obtain the RPM data from the engine ECU 12. Alternatively, the processor 100 or the selected first or second circuit 108 can sniff (sense) the CAN bus 16 to obtain the RPM data of the engine of the vehicle 10.

If the processor 100 or the selected first or second circuit 108 determines that the engine of the vehicle 10 is running (i.e., if the RPM is greater than zero), the method 200 proceeds to element 250 shown in FIG. 5C, and the processor 100 executes instructions to cause the selected first or second circuit 108 to perform a forced regeneration of the DPF 64 as shown in FIG. 5C. If, however, the processor 100 or the selected first or second circuit 108 determines that the engine of the vehicle 10 is not running (i.e., if the RPM is not greater than zero), the method 200 proceeds to element 212, and the processor 100 executes instructions to cause the selected first or second circuit 108 to perform a procedure to reset fault codes as shown in the remainder of FIG. 5A and to optionally reset the AFT 50 as shown in FIG. 5B.

Throughout the discussion below, it is assumed that the first circuit 108-1 is selected. It is understood, however, that should the second circuit 108-2 be selected instead, the functions and operations performed by the second circuit 108-2 will be similar to those performed by the first circuit 108-1 as described below. Further, it is also understood that some or all of the operations performed by the first circuit 108-1 (or the second circuit 108-2) as described above and below may be performed by the processor 100. Likewise, some or all of the operations performed by the processor 100 as described above and below may be performed by the first circuit 108-1 (or the second circuit 108-2).

At 212, the first circuit 108-1 establishes read/write access to all the ECUs 12. For example, the access control circuit 110-1 of the first circuit 108-1 performs an authentication (e.g., a security handshake) procedure with one or more of the ECUs 12 and gains read/write access to all the ECUs 12.

At 214, the first circuit 108-1 selects a first one of the ECUs 12. At 216, the access control circuit 110-1 accesses the selected ECU 12 and determines if any fault code is present in the selected ECU 12. The method 200 proceeds to element to 220 if a fault code is not present in the selected ECU 12. At 218, if a fault code is present in the selected ECU 12, the read/write circuit 112-1 writes to an appropriate register in the selected ECU 12, which causes the selected ECU 12 to clear the fault code. For example, the read/write circuit 112-1 may transmit a command that, when written into the selected ECU 12, initiates a procedure or subroutine to clear the fault code. Other methods of clearing the fault codes may be used.

At 220, the first circuit 108-1 determines whether the subsystem 14 controlled by the selected ECU 12 has been serviced, which would require clearing any data learned by the ECU 12 prior to the servicing. For example, the read/write circuit 112-1 can obtain this information by reading a register in the selected ECU 12. The method 200 proceeds to element 224 if the subsystem 14 controlled by the selected ECU 12 has not been serviced, and clearing the learned data is unnecessary.

At 222, if the subsystem 14 controlled by the selected ECU 12 has been serviced, and clearing the learned data is necessary, the read/write circuit 112-1 writes to an appropriate register in the selected ECU 12, which causes the selected ECU 12 to clear the learned data. For example, the read/write circuit 112-1 may transmit a command that, when written into the selected ECU 12, initiates a procedure or subroutine to clear the learned data. Other methods for clearing the learned data may be used.

At 224, the first circuit 108-1 determines whether the selected ECU 12 is the last one of the ECUs 12 (i.e., whether all the ECU's 12 have been checked for fault codes). At 226, if the selected ECU 12 is not the last one of the ECUs 12 (i.e., if all the ECUs 12 have not been checked for fault codes), the access control circuit 110-1 selects the next one of the ECUs 12, and the method returns to 216.

At 228, if the selected ECU 12 is the last one of the ECUs 12 (i.e., if all the ECUs 12 have been checked for fault codes and if the fault codes of all the ECUs 12 have been cleared), the processor 100 checks the timer and determines whether a predetermined time (e.g., 1 minute) has elapsed. The method 200 waits until the predetermined time elapses. This provides the first circuit 108-1 sufficient time to clear all the fault codes of all of the ECUs 12.

In some implementations, the first circuit 108-1 does not read fault codes; rather, the first circuit 108-1 simply clears the fault codes. The processor 100 checks the timer and determines whether a predetermined time (e.g., 1 minute) has elapsed. The method 200 waits until the predetermined time elapses. This provides the first circuit 108-1 sufficient time to clear all the fault codes of all of the ECUs 12.

At 230, the first circuit 108-1 determines whether the portable device 11 is still receiving power from the vehicle 10 (i.e., the portable device 11 is still connected to the vehicle 10). The method 200 ends if the portable device 11 is no longer receiving power from the vehicle 10 (i.e., the portable device 11 is disconnected from the vehicle 10). The method 200 proceeds to element 232 if the portable device 11 is still receiving power from the vehicle 10 (i.e., the portable device 11 is still connected to the vehicle 10). The method 200 continues and performs the next procedure, which is to reset the AFT 50 as shown in FIG. 5B and as described below.

In FIG. 5B, at 232, the first circuit 108-1 determines if it is authenticated to reset and reprogram the ECU 52, which is one of the ECU' 12 controlling the AFT 50 as explained above with reference to FIG. 2. In some implementations this determination may be unnecessary since the authentication performed at element 212 may be sufficient, in which case the method 200 proceeds to element 236.

At 234, if it is necessary to establish or re-establish authentication to reset and reprogram the ECU 52, the first circuit 108-1 optionally establishes or re-establishes read/write access to the ECU 52. For example, the access control circuit 110-1 performs an authentication (e.g., a security handshake) procedure with the ECU 52 (or with multiple ECUs if more than one ECU is used to control multiple components of the AFT 50) and gains read/write access to the ECU 52 (or the multiple ECUs controlling the multiple components of the AFT 50).

At 236, the access control circuit 110-1 accesses the ECU 52 (or the multiple ECUs controlling the multiple components of the AFT 50) and determines if any fault code(s) are present in the ECU 52 (or the multiple ECUs controlling the multiple components of the AFT 50). The method 200 proceeds to element to 240 if any fault code(s) are not present in the ECU 52 (or the multiple ECUs controlling the multiple components of the AFT 50).

At 238, if any fault code(s) are present in the ECU 52 (or the multiple ECUs controlling the multiple components of the AFT 50), the read/write circuit 112-1 writes to an appropriate register in the ECU 52 (or the multiple ECUs controlling the multiple components of the AFT 50), which causes the ECU 52 (or the multiple ECUs controlling the multiple components of the AFT 50) to clear the fault code(s). For example, the read/write circuit 112-1 may transmit a command that, when written into the ECU 52 (or the multiple ECUs controlling the multiple components of the AFT 50), initiates a procedure or subroutine to clear the fault code(s). Other methods of clearing the fault codes may be used.

At 240, regardless of whether any component of the AFT 50 has been serviced, the read/write circuit 112-1 writes to an appropriate register in the ECU 52 (or the multiple ECUs controlling the multiple components of the AFT 50), which causes the ECU 52 (or the multiple ECUs controlling the multiple components of the AFT 50) to clear any learned data stored in the ECU 52 (or the multiple ECUs controlling the multiple components of the AFT 50). For example, the read/write circuit 112-1 may transmit a command that, when written into the ECU 52 (or the multiple ECUs controlling the multiple components of the AFT 50), initiates a procedure or subroutine to clear the learned data. Other methods for clearing the learned data may be used.

At 242, the read/write circuit 112-1 writes to an appropriate register in the ECU 52 (or the multiple ECUs controlling the multiple components of the AFT 50), which causes the ECU 52 (or the multiple ECUs controlling the multiple components of the AFT 50) to reprogram all parameters to default values. The reprogramming of all the parameters associated with the AFT 50 to default values is called resetting the AFT 50. Subsequently, the method 200 ends. Examples of parameters follow.

For example, resetting the AFT 50 clears issues related to soot level, ash level, ash accumulation, SCR accumulation, SCR NOx poisoning level, engine learned data, AFT learned data, DPF zone level, NOx sensor data, and DPF regeneration timers. This list is not exhaustive. The soot level includes measurement of soot in the DPF 64. The ash level includes measurement of ash in the DPF 64. The SCR accumulation includes measurement of accumulation in the SCR component 66. The SCR NOx poisoning level includes measurement of NOx efficiency and efficiency of the SCR component 66. This is controlled by various measurements configured by the AFT 50. The engine learned data includes data learned from various engine components to adjust injection timing based on characteristics of engine sensor values. Examples include data learned from EGR mass air flow sensor, boost pressure sensor, MAP pressure sensor, and NOx Sensor. The AFT learned data includes measurements of regeneration operation and sensor values. Examples include data learned from DPF temperature sensors, DPF pressure sensors, and NOx sensors. The DPF zone level includes DPF status or zone level status. This is also an alternative to DPF soot load that is calculate by the ECU 52. The NOx sensor data includes data learned from NOx sensors. The DPF regeneration timers store measurement of time since the last DPF regeneration occurred. This is calculated based on time, miles driven, fuel usage.

Recall that in FIG. 5A, at 210, the method 200 determines whether the engine of the vehicle 10 is running (i.e., if RPM of the engine is greater than zero), and the method 200 proceeds to element 250 shown in FIG. 5C to perform a forced regeneration of the DPF 64 if the engine of the vehicle 10 is running (i.e., if the RPM is greater than zero).

In FIG. 5C, at 250, if the engine of the vehicle 10 is running (i.e., if the RPM is greater than zero), the processor 100 or the first circuit 108-1 further determines, based on the connection to the CAN bus 16 of the vehicle 10, if the vehicle 10 is at rest (i.e., if the speed of the vehicle 10 is zero). For example, the processor 100 or the first circuit 108-1 can transmit a query to an engine ECU 12 and obtain the speed data from the engine ECU 12. The method 200 ends if the vehicle 10 is moving (i.e., if the speed of the vehicle 10 is not zero).

At 252, if the vehicle 10 is at rest (i.e., if the speed of the vehicle 10 is zero and if the parking gear is engaged), the processor 100 executes instructions that cause the first circuit 108-1 to send a command to the AFT 50 to initiate a forced regeneration of the DPF 64 in the AFT 50. For example, the read/write circuit 112-1 writes to an appropriate register in the ECU 52 (or an ECU controlling the DPF 64), which causes the ECU 52 (or an ECU controlling the DPF 64) to start a forced regeneration procedure. For example, the procedure includes increasing fuel supply to the AFT 50, raising the engine RPM, and raising the temperature of the DPF 64 to burn off the soot in the DPF 64.

At 254, the processor 100 checks the timer and determines whether a predetermined time (e.g., about 1 hour) has elapsed. The predetermined time is calculated based on the ECU's (52) request to regenerate the system (50). The forced regeneration procedure can take anywhere from 30 minutes to an hour and 30 minutes. The engine RPM reduces to idle RPM once the forced regeneration procedure completed. The engine ECU or the ECU 52 that controls the AFT 50 determines this amount of time to allow enough time to burn off the soot in the AFT 50. The method 200 waits until the predetermined time elapses. This provides the AFT 50 and the ECU 52 (or an ECU such as the engine ECU controlling the DPF 64) sufficient time to regenerate the DPF 64.

At 256, if the predetermined time has not yet elapsed, the first circuit 108-1 determines if a fault has occurred during the forced regeneration procedure. The method 200 ends if a fault occurs during the forced regeneration procedure. The method 200 returns to element 254 if no fault occurs during the forced regeneration procedure. The method 200 continues until the forced regeneration procedure completes or aborts due to a fault.

At 258, if no fault occurs during the forced regeneration procedure, the forced regeneration procedure is complete after the predetermined time has elapsed, and the method 200 ends. The engine RPM decreases to idle RPM, and the temperature of the DPF 64 decreases. At this point, the vehicle is drivable.

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A portable device for controlling a plurality of subsystems of a vehicle, comprising:
 a control circuit to communicate with a plurality of Electronic Control Units (ECUs) of the vehicle respectively controlling the plurality of subsystems of the vehicle via a Controller Area Network (CAN) bus of the vehicle in response to the portable device being connected to the vehicle via a connector in the vehicle and receiving power from a battery of the vehicle via the connector;
 a processor to communicate with the control circuit; and
 a memory to store instructions which when executed by the processor configure the control circuit to:
  determine whether an engine of the vehicle is running and a speed of the vehicle if the engine is running;
  send, prior to initiating a forced regeneration, data on the CAN bus to clear one or more fault codes associated with one or more of the plurality of ECUs in response to determining that the engine of the vehicle is not running;
  send data on the CAN bus to reset parameters of one of the plurality of ECUs controlling an exhaust system of the vehicle to default values in response to the portable device remaining connected to the vehicle for a predetermined time period after sending the data to clear the one or more fault codes and prior to initiating the forced regeneration; and
  send, in response to determining that the engine is running and that the speed of the vehicle is zero, data on the CAN bus to the one of the plurality of ECUs controlling the exhaust system to initiate the forced regeneration of a diesel particulate filter of the exhaust system of the vehicle,
 wherein the portable device automatically, without interaction with an external device, clears the one or more fault codes, resets the parameters, and initiates the forced regeneration.

2. The portable device of claim 1 wherein the instructions when executed by the processor configure the control circuit to:
 sense a speed of the CAN bus of the vehicle;
 select a first circuit of the control circuit to communicate with the CAN bus in response to the speed of the CAN bus being a first speed; and
 select a second circuit of the control circuit to communicate with the CAN bus in response to the speed of the CAN bus being a second speed.

3. The portable device of claim 1 wherein the instructions when executed by the processor configure the control circuit to perform an authentication procedure with the plurality of ECUs and secure read/write access to the plurality of ECUs.

4. The portable device of claim 1 wherein the instructions when executed by the processor configure the control circuit to initiate the forced regeneration when a parked regeneration of the diesel particulate filter is disabled.

5. The portable device of claim 1 wherein the data to clear the one or more fault codes includes commands that are executed by the one or more of the plurality of ECUs to clear the one or more fault codes associated with the one or more of the plurality of ECUs.

6. The portable device of claim 1 wherein the data to clear the one or more fault codes further includes commands that are executed by the one or more of the plurality of ECUs to reset data learned by the one or more of the plurality of ECUs.

7. The portable device of claim 1 wherein the data to reset the parameters includes commands that are executed by the one of the plurality of ECUs controlling the exhaust system of the vehicle to reset the parameters to the default values.

8. The portable device of claim 1 wherein the data to reset the parameters further includes commands that are executed by the one of the plurality of ECUs to reset data learned by the one or more of the plurality of ECUs.

9. The portable device of claim 1 wherein the parameters include one or more of a soot level of the diesel particulate filter, an ash level of the diesel particulate filter, a zone level of the diesel particulate filter, regeneration timers of the diesel particulate filter, data learned after a prior regeneration of the diesel particulate filter, NOx sensor data, an efficiency of a selective catalytic reduction component of the exhaust system.

10. A method for controlling a plurality of subsystems of a vehicle using a portable device, comprising:
 receiving power at the portable device from a battery of the vehicle in response to the portable device being connected to the vehicle via a connector in the vehicle;
 communicating, using the portable device, with a plurality of Electronic Control Units (ECUs) of the vehicle respectively controlling the plurality of subsystems of the vehicle via a Controller Area Network (CAN) bus of the vehicle;
 determining, using the portable device, whether an engine of the vehicle is running and a speed of the vehicle if the engine is running;
 sending, using the portable device, prior to initiating a forced regeneration, data on the CAN bus to clear one or more fault codes associated with one or more of the plurality of ECUs in response to determining that the engine of the vehicle is not running;
 sending, using the portable device, data on the CAN bus to reset parameters of one of the plurality of ECUs controlling an exhaust system of the vehicle to default values in response to the portable device remaining connected to the vehicle for a predetermined time period after sending the data to clear the one or more fault codes and prior to initiating the forced regeneration;
 sending, using the portable device, in response to determining that the engine is running and that the speed of the vehicle is zero, data on the CAN bus to the one of the plurality of ECUs controlling the exhaust system to initiate the forced regeneration of a diesel particulate filter of the exhaust system of the vehicle; and
 automatically, without interaction with an external device, clearing the one or more fault codes, resetting the parameters, and initiating the forced regeneration.

11. The method of claim 10 further comprising:
 sensing, using the portable device, a speed of the CAN bus of the vehicle;
 selecting, based on the speed, a circuit in the portable device to communicate with the CAN bus.

12. The method of claim 10 further comprising performing, using the using the portable device, an authentication procedure with the plurality of ECUs and secure read/write access to the plurality of ECUs.

13. The method of claim 10 further comprising initiating, using the using the portable device, the forced regeneration when a parked regeneration of the diesel particulate filter is disabled.

14. The method of claim 10 wherein sending the data to clear the one or more fault codes includes sending commands that are executed by the one or more of the plurality of ECUs to clear the one or more fault codes associated with the one or more of the plurality of ECUs.

15. The method of claim 10 wherein sending the data to clear the one or more fault codes further includes sending commands that are executed by the one or more of the plurality of ECUs to reset data learned by the one or more of the plurality of ECUs.

16. The method of claim 10 wherein sending the data to reset the parameters includes sending commands that are executed by the one of the plurality of ECUs controlling the exhaust system of the vehicle to reset the parameters to the default values.

17. The method of claim 10 wherein sending the data to reset the parameters further includes sending commands that are executed by the one of the plurality of ECUs to reset data learned by the one or more of the plurality of ECUs.

18. The method of claim 10 wherein the parameters include one or more of a soot level of the diesel particulate filter, an ash level of the diesel particulate filter, a zone level of the diesel particulate filter, regeneration timers of the diesel particulate filter, data learned after a prior regeneration of the diesel particulate filter, NOx sensor data, an efficiency of a selective catalytic reduction component of the exhaust system.

19. The portable device of claim 1 wherein the portable device does not include an input/output device for a user for interacting with the portable device or with the CAN bus.

\* \* \* \* \*